United States Patent [19]
Kobayashi

[11] Patent Number: 5,936,764
[45] Date of Patent: Aug. 10, 1999

[54] LASER SCANNING OPTICAL MICROSCOPE

[75] Inventor: Koji Kobayashi, Chofu, Japan

[73] Assignee: Kowa Company Ltd., Japan

[21] Appl. No.: 08/899,380

[22] Filed: Jul. 23, 1997

Related U.S. Application Data

[62] Division of application No. 08/225,544, Apr. 11, 1994, Pat. No. 5,691,839.

[30] Foreign Application Priority Data

Apr. 15, 1993 [JP] Japan ................................ 5-87693

[51] Int. Cl.$^6$ ................................................... G02B 21/06
[52] U.S. Cl. .......................... 359/385; 359/201; 359/368
[58] Field of Search .................................... 359/196–202, 359/211–218, 234, 368, 383, 385–390, 285–287; 250/201.3, 216, 235; 351/205, 243, 221, 206; 372/24, 26, 92–101, 108

[56] References Cited

U.S. PATENT DOCUMENTS

| | | | |
|---|---|---|---|
| 4,992,858 | 2/1991 | Kobayashi | 358/53 |
| 5,028,802 | 7/1991 | Webb et al. | 250/571 |
| 5,225,924 | 7/1993 | Ogawa et al. | 359/211 |
| 5,386,112 | 1/1995 | Dixon | 359/368 |
| 5,394,268 | 2/1995 | Lanni et al. | 359/368 |
| 5,557,452 | 9/1996 | Harris | 359/368 |
| 5,691,839 | 11/1997 | Kobayashi | 359/385 |

*Primary Examiner*—Thong Nguyen
*Attorney, Agent, or Firm*—Adams & Wilks

[57] ABSTRACT

A laser scanning optical microscope comprises a first optical scanning device for generating a laser beam and scanning a specimen with the laser beam in a direction at a preselected frequency. A drive circuit controls the first optical scanning device to scan the specimen with the laser beam. A pair of second optical scanning devices scan the laser beam in directions perpendicular and parallel to the scanning direction of the first optical scanning device at two frequencies lower than the preselected frequency. A light receiving device receives light reflected or transmitted by the scanned specimen and produces a photoelectric signal. A signal processing device converts the photoelectric signal obtained from the light receiving device to a standard television scanning signal corresponding to a laser beam scanning pattern obtained with the first optical scanning device and the pair of second optical scanning devices.

12 Claims, 12 Drawing Sheets

LASER SCANNING OPTICAL MICROSCOPE

This is a division of application Ser. No. 08/225,544 filed Apr. 11, 1994, now U.S. Pat. No. 5,691,839.

FIELD OF THE INVENTION

The present invention relates to a laser scanning optical microscope, and more particularly to a laser scanning optical microscope in which a laser beam from a laser light source is focussed to a small spot by an objective optical system and projected onto a specimen while also being scanned two-dimensionally, and light reflected or transmitted by the specimen is detected and photoelectrically converted by light receiving means to thereby obtain image information on the specimen.

BACKGROUND OF THE INVENTION

The optical scanning microscope is a combination of optical microscopy, with its long history, and electronics, which has made rapid progress in recent years, and its usefulness is widely recognized, especially with the development of the confocal point optical system. One of the advantages of the confocal optical system is that it can provide a marked improvement in image resolution and contrast by eliminating unwanted scattered light.

The basic principle of the optical scanning microscope and confocal optical system was described over thirty years ago (see Reference (1): U.S. Pat. No. 3,013,467). In the systems of the time, an ordinary lamp was used as the light source and scanning was effected by using a voice coil mechanism to move the specimen stage, which made it difficult to quickly produce clear images.

With the aim of providing real-time image capability, a confocal optical microscope that used a Nipkow disk perforated with a large number of holes was developed a considerable time ago (see for example Reference (2): Journal of the Optical Society of America Vol. 58 (1968) pp 661 to 664; U.S. Pat. No. 3,517,980; and U.S. Pat. No. 4,802,748). This system, which was referred to as tandem scanning, could provide real-time naked-eye or photographic observation of images without using optoelectronic conversion, and received some practical application. However, a critical drawback of the tandem and other Nipkow disk system confocal microscopes has been that the light source was not bright enough, and a further problem was that with some observation objects the confocal effect was too small. These drawbacks have continued to limit the application of such systems.

With the emergence of lasers, with their high spatial coherence, lasers have also come into use as light sources for confocal microscopes. In the first laser scanning microscopes (LSMs) the movement of the laser beam was effected by moving the objective lens in close proximity to the specimen (see Reference (3): Nature Vol. 223 (1969) p831; Applied Optics, Vol. 10 (1971) pp 1615 to 1619). Since then the development of laser scanning microscopes has resulted in many improvements that have broadened the range of application of such instruments to a number of fields including mineralogy, semiconductors, medicine, biology and cytology.

LSMs are divided broadly into types in which the specimen stage is scanned and types in which the laser beam is scanned. Some systems use a polygonal mirror rotating at high speed for linear laser beam scanning for cytological examinations (see Reference (4): The Journal of Histochemistry and Cytochemistry Vol. 27 (1979) pp 153 to 159; Analytical and Quantitative Cytology Vol. 3 (1981) pp 55 to 66). However, in recent years most commercial LSMs are stage scanning systems or beam scanning systems that incorporate a mirror galvanometer and acousto-optical deflector (AOD) or the like (see Reference (5): Scanning Vol. 7 (1985) pp 79 to 87 and pp 88 to 96). Compared to beam scanning systems, stage scanning systems are advantageous in terms of objective lens distortion and simplicity of the apparatus; in some cases the focus of development has been aimed at modifying the stage itself (see Reference (6): JP-A-62-17723). Two-dimensional laser beam scanning by mirror galvanometer is used by many LSMs, but there have been many announcements of systems using AODs as a way of attaining higher scanning speeds.

For example, a non-confocal system transmission type LSM has been announced which uses two AODs arranged at right angles to scan a laser beam two-dimensionally (see Reference (7): JP-A-61-248023; Applied Optics Vol. 25 (1986) pp 4115 to 4121). A slit confocal type LSM has been announced which uses a total of three scanning systems, an AOD and a mirror galvanometer used to scan the beam in two dimensions and a CCD line sensor as the light receiving means (see Reference (8): JP-A-61-80215; SPIE Proceedings Vol. 765 (1987) pp 53 to 60). A pinhole confocal system has also been realized in a reflecting microscope in which an AOD and mirror galvanometer are used to provide two-dimensional scanning (see Reference (9): JP-A-63-298211; SPIE Proceedings Vol. 809 (1987) pp 85 to 88). A reflecting and transmitting type confocal system has also been developed using two AODs at right angles and a non-storage type image dissector tube (IDT) (see Reference (10): U.S. Pat. No. 4,827,125; SPIE Proceedings Vol. 1161 (1989) pp 268 to 278).

However, a major drawback with such LSMs is the difficulty of the laser beam scanning control method. The stage scanning LSM of Reference (6), for example, performs excellently when the specimen of interest is something stationary, such as a mineral sample, but is entirely unsuitable for viewing a live biological specimen moving in a solution. For observation of live biological specimens, it is necessary to use a high-speed laser beam scanning that is compatible with a standard TV scanning rate.

The system described in Reference (4) which uses a polygonal mirror deflector is advantageous in terms of high scanning speed and linearity, and can be made compatible with normal video rates. However, the high-speed polygonal mirror, which uses pneumatic bearings, makes the system apparatus large and costly, and there are other problems such as the service life and reliability of the bearings, shaft run-out and facet trueness and, in a high magnification power microscope, the difficulty of excluding the effects of the vibration produced by the rotation of the deflector itself, all of which combine to make such a system less than fully practicable.

In the mirror galvanometer LSM of Reference (5), the use of a resonance-vibration mirror provides some degree of high-speed scanning capability. With a mirror frequency set at 8 kHz, for example, it should be possible to follow a standard TV horizontal scan frequency (about 16 kHz). However, the rapid wear on mirror suspension bearings caused by such a high resonant frequency has an adverse affect on system durability. Over time, shaft wear and fatigue can result in shaft run-out, deviation, hysteresis and other such variation, which, in the case of an LSM in which image quality depends on the beam scanning precision, degrades the reliability of the system itself.

A system that uses the precision scanning performance of the non-oscillation AOD for high-speed scanning can be readily adapted to a standard television horizontal scanning frequency of 15.75 kHz. As the vertical scanning frequency of 60 Hz is readily attainable even with a mirror galvanometer or scanning stage, the incorporation of an AOD permits images of living biological specimens to be viewed at video picture frequency in real-time on a TV monitor. However, a drawback of acousto-optical deflectors is that as they are diffraction devices, and the wavelength dependency of the diffraction can produce color dispersion, and also, owing to polarization plane constraints, it is difficult to apply AODs to confocal fluorescent microscopes which use the acquisition of weak fluorescent light of different wavelengths produced when cells or the like are excited by the laser beam.

A system described in Reference (9) attempts to tackle this using an AOD and pinhole to detect the fluorescent component. In the system configuration used for this, piezoelectric devices are used to control the three-dimensional spatial positioning of the pinhole, but owing to various constraints such as the AOD transmission loss and the Bragg angle dependency of the incident light, optical system settings are not easy.

By using a CCD line sensor or IDT as the detector as in References (8) and (10), the detected fluorescent light is not passed through the AOD, thereby avoiding such problems. However, the fact that the CCD line sensor is a stored charge device means that in the case of a confocal system of a microscope, resolution cannot be improved in the CCD scanning direction. Additionally, since the detector is incapable of providing higher sensitivity, such a system is not suited to applications involving the detection of weak fluorescent light. Moreover, while the use of an IDT makes it possible to configure a confocal system that also offers high sensitivity during detection of fluorescent light, the fact that the laser beam scanning and synchronization systems are complex and that IDTs are very costly makes the practicality of such systems questionable.

The biggest drawback of an AOD deflector is that when high image resolution is a specific requirement, the AOD has to be constituted of a special substance such as $TeO_2$ or $PbMoO_4$, formed into a flat, uniform optical medium with a large-diameter aperture. This usually requires the disposition of an anamorphic lens, which is complex to adjust, at the front and rear of the AOD, and the crystal itself is far more costly than small-aperture media.

With reference to the cost aspect, a high-speed vibration mirror is costly, and a high-precision, high-speed polygonal mirror with pneumatic bearings is very costly. This, together with problems concerning deflector reliability and ease of use, is probably what has hindered the practical use and spread of LSMs which permit real-time observation.

Recent years have also seen the realization of high-definition television (HDTV), the aim of which is to provide improved resolution and picture quality, and the feasibility of HDTV compatible LSM systems is being studied. However, with an HDTV system having a horizontal scanning frequency of 30 kHz or more, the above-described problems of each type of deflector arrangement would be correspondingly magnified if attempts were made to operate them at such a high frequency. For this reason, despite the interest in the potential of a HDTV compatible LSM, specific working principles or methods for a commercially practicable system have not yet emerged.

The object of this invention is to provide a laser scanning microscope in which the deflector control arrangement is highly reliable and offers long service life and high scanning precision and stability even under high scanning frequency operation, and in which the confocal system can be arranged as a reflection or transmission mode system and can readily be used to detect weak fluorescent light having a different wavelength from that of the scanning laser beam, and in which the optical deflector can be configured at low cost, and can be adapted to high-definition television.

SUMMARY OF THE INVENTION

In accordance with this configuration, a laser beam is scanned two-dimensionally using three or more optical scanning means each having a different scanning frequency, which enables the performance conditions required of each scanning means to be reduced, thus providing a durable, low cost deflection control system that is highly stable and precise even at high scanning frequencies. Moreover, the ability to use either a slit or pinhole detection aperture for the confocal system of the microscope, whether reflection or transmission, provides a large degree of configurability. As the light receiving means, a high sensitivity point type photosensor such as a photomultiplier or avalanche photodiode can be readily used, and is particularly advantageous for detecting weak fluorescent light from cells and other such specimens. Furthermore, although a special scanning pattern is used, the system is equipped with signal processing means which enables the images to be viewed on an ordinary TV monitor and can be readily adapted for high-definition television, providing a new and highly reliable, low cost system that is commercially feasible.

DETAILED DESCRIPTION OF THE PREFERRED EMBODIMENTS

Figure 1:
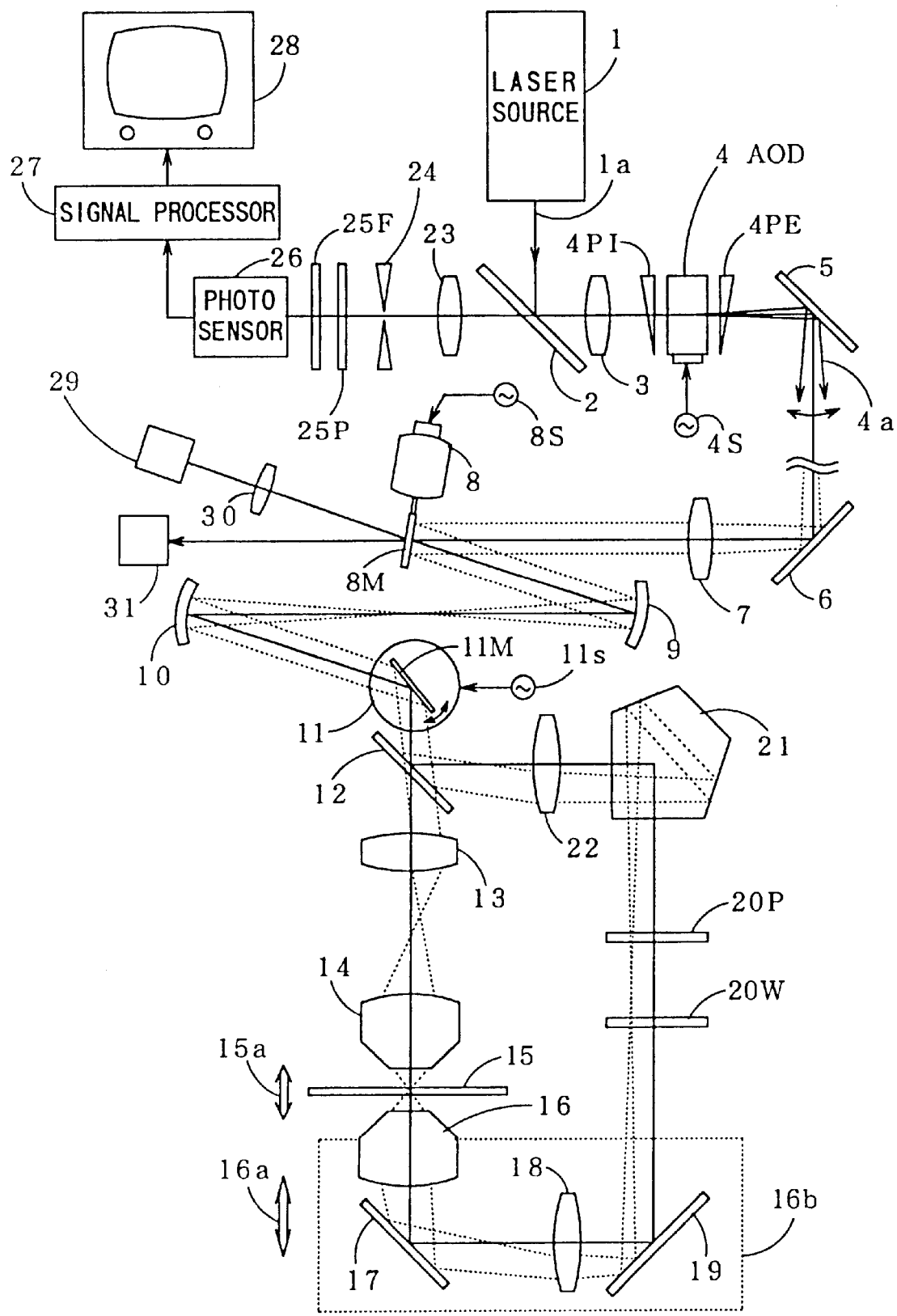
FIG. 1 shows the general arrangement of the optical system of the laser scanning optical microscope apparatus according to the present invention.

FIG. 1 shows the general arrangement of mainly the optical system of the laser scanning optical microscope according to the present invention. In FIG. 1, reference numeral 1 denotes a laser diode (LD), helium-neon (He-Ne), argon ion (Ar+), helium-cadmium (He - Cd) or other such laser light source which emits light at for example one of the wavelengths 830 nm (infrared) or 670 nm (red) in the case of an LD, 1152 nm (infrared), 632.8 nm (red), 611.9 nm (orange), 594.1 nm (yellow) or 543.5 nm (green) in the case of a He - Ne laser, 514.5 nm (blue-green) or 488 nm (blue), 457.9 nm (deep blue) in the case of an Ar+ laser, or 441.6 nm (deep blue) or 325 nm (ultraviolet) in the case of a He - Cd laser. Although usually a plurality of laser sources will be used, with beams being combined by a dichroic mirror or the like and a shutter or other such means to enable particular wavelengths to be selected as required, for the purpose of this example and depiction it is assumed that there is one laser tube.

A laser beam 1a emitted by the laser light source 1 is reflected by a beam-splitter 2 and relayed by a lens 3 onto a first scanning means 4. This first scanning means 4 is a non-mechanical optical deflector that can deflect the laser beam at or above a scanning frequency of 5 MHz, such as for example an acousto-optical deflector (AOD) or electro-optical deflector (EOD). Of the two, an AOD, which utilizes ultrasonic optical wave diffraction, is preferable, as it does not require a high voltage. Thus, the arrangement described here assumes an AOD is used. The AOD 4 is controlled by drive signals from a signal source 4s. The deflection of the laser beam by the AOD 4 is controlled by drive signals from a signal source 4s, which provide the control by changing the lattice constant (width) of the ultrasonic wave diffraction lattice formed in the crystal medium. The AOD 4 is bracketed by prisms 4PI and 4PE, which makes it possible to compensate for the wavelength dependency of the angles of AOD beam incidence and emergence. With the first scanning means 4, a scanning frequency of 7.16 MHz, for example, is selected for overall synchronization of the system with the standard NTSC television scanning system.

Part of the laser beam 4a scanned at high speed in one direction by the AOD 4 is reflected by mirrors 5 and 6 and is guided via lens 7 to a vibration mirror 8M of a resonant vibration galvanometer 8. The vibration galvanometer 8 is driven from a signal source 8s to use mirror 8M to effect sine wave deflection of the beam. Galvanometer 8 and mirror 8M form a second scanning means that operates at a frequency such as 3.94 kHz, for example, selected based on an overall system consideration of the standard TV scanning system. The scanning by the second scanning means is perpendicular to the scanning by the first scanning means.

The raster of the laser beam scanned two-dimensionally by the AOD (first scanning means) 4 and the vibration mirror 8M (second scanning means) is relayed by spherical relay mirrors 9 and 10 and further deflected by a mirror galvanometer 11M of a galvanometer 11. The galvanometer 11 is driven from a signal source 11s to deflect the laser beam in a sawtooth scanning pattern, forming a third scanning means. A scanning frequency of 60 Hz, for example, is selected for the mirror galvanometer 11M, based on a consideration of the standard TV scanning system. The scanning by the third scanning means is perpendicular to the scanning by the second scanning means, and parallel to the scanning by the first scanning means.

The two-dimensional raster scan produced by the laser beam being reflected by the mirror galvanometer 11M (i.e. the third scanning means) is guided by beam-splitter 12 and relay lens 13 so that it passes through the objective lens 14 and is focussed onto a specimen 15.

Optical microscopes such as this are divided broadly into those in which reflected light is used to view the specimen and those in which the specimen is viewed using transmitted light, either of which can be implemented with the optical system configuration illustrated in the embodiment of FIG. 1. First, an explanation will be made with reference to the light path used for observation by transmitted light, and this will be followed by an explanation made with reference to observation by reflected light.

When using transmitted light for observation, light transmitted by the specimen 15 passes through an objective (condenser) lens 16, is reflected by a mirror 17, relayed by a relay lens 18, a mirror 19, a wavelength plate 20w, a polarizing plate 20p, a pentaprism 21 and a relay lens 22 and is reflected by the beam-splitter 12 to thereby join the light path on the projection side. The wavelength plate 20w and polarizing plate 20p utilize the rotation of the light at the polarization plane to ensure that ultimately only transmitted light is detected, with little loss by the optical system. The pentaprism 21 inverts the path of the scanning beam in one dimension and brings the path of the light transmitted by the specimen into coincidence with the projected light path.

From the beam-splitter 12, the light transmitted by the specimen travels back along the same optical system used for projecting the beam, passing via elements 11, 10, 9, 8, 7, 6, 5, 4 and 3, and then via beam-splitter 2, lens 23, confocal aperture 24, polarizing plate 25p and wavelength plate 25F to be detected by a photosensor 26. The confocal point aperture 24 is located at a point that is an optical conjugate of the specimen 15 image formation point to block scattered light components from outside the point of beam focus, thereby serving to provide a major improvement in image resolution and contrast.

In the reflected light observation mode, light reflected from the specimen 15 travels back along the same optical system used for projecting the beam, passing via elements 14, 13, 12, 11, 10, 9, 8, 7, 6, 5, 4 and 3 and beam-splitter 2, then passes via lens 23, confocal aperture 24, polarizing plate 25p and wavelength filter 25F and is detected by the photosensor 26.

Reflected or transmitted light from which stray light components have been eliminated by the confocal point aperture 24 are photoelectrically converted by the photosensor 26 to detection signals ultimately used to generate specimen video signals.

By using a prescribed setting for the direction of polarization by the polarizing plate 20p and wavelength plate 20w, it is possible to select whether the photosensor 26 will detect reflected light components or transmitted light components from the specimen. In the same way, it is possible to detect a fluorescent light image of the specimen by using a prescribed setting for the wavelength characteristics of the filter 25F. After being processed by a signal processor 27, the detection signals are input to an image output device 28 such as a TV monitor to display the microscopic images of the specimen 15.

The focus of the laser beam spot on the specimen can be adjusted by moving the image formation position of the beam or the position of the specimen 15 along the axis of the microscope's optical system, as indicated by the arrow 15a. It is simpler to move the specimen 15, which is done by vertical adjustment of the specimen stage.

The length of the light path will vary according to the specimen 15. As such, it is preferable to adjust the confocal image formation condition by vertically moving (as indicated by arrow 16a), as one unit, the part of the arrangement constituted by objective lens 16, mirror 17, lens 18 and mirror 19 (that is, the part within the dotted line box 16b in FIG. 1). This axial adjustment of the focus can be used as a fourth scanning means that scans the beam in a third dimension with respect to the two-dimensional scanning by the first to third scanning means.

The back of the vibration mirror 8M constituting the second scanning means is illuminated by a light beam from a light-emitting diode 29 via lens 30, which is reflected onto a photosensor 31 used to detect the scanning position. The photosensor 31 puts out a signal that is used as a reference signal to control synchronization timing and correct hysteresis accompanying sine wave scanning by the second scanning means.

Figure 2:
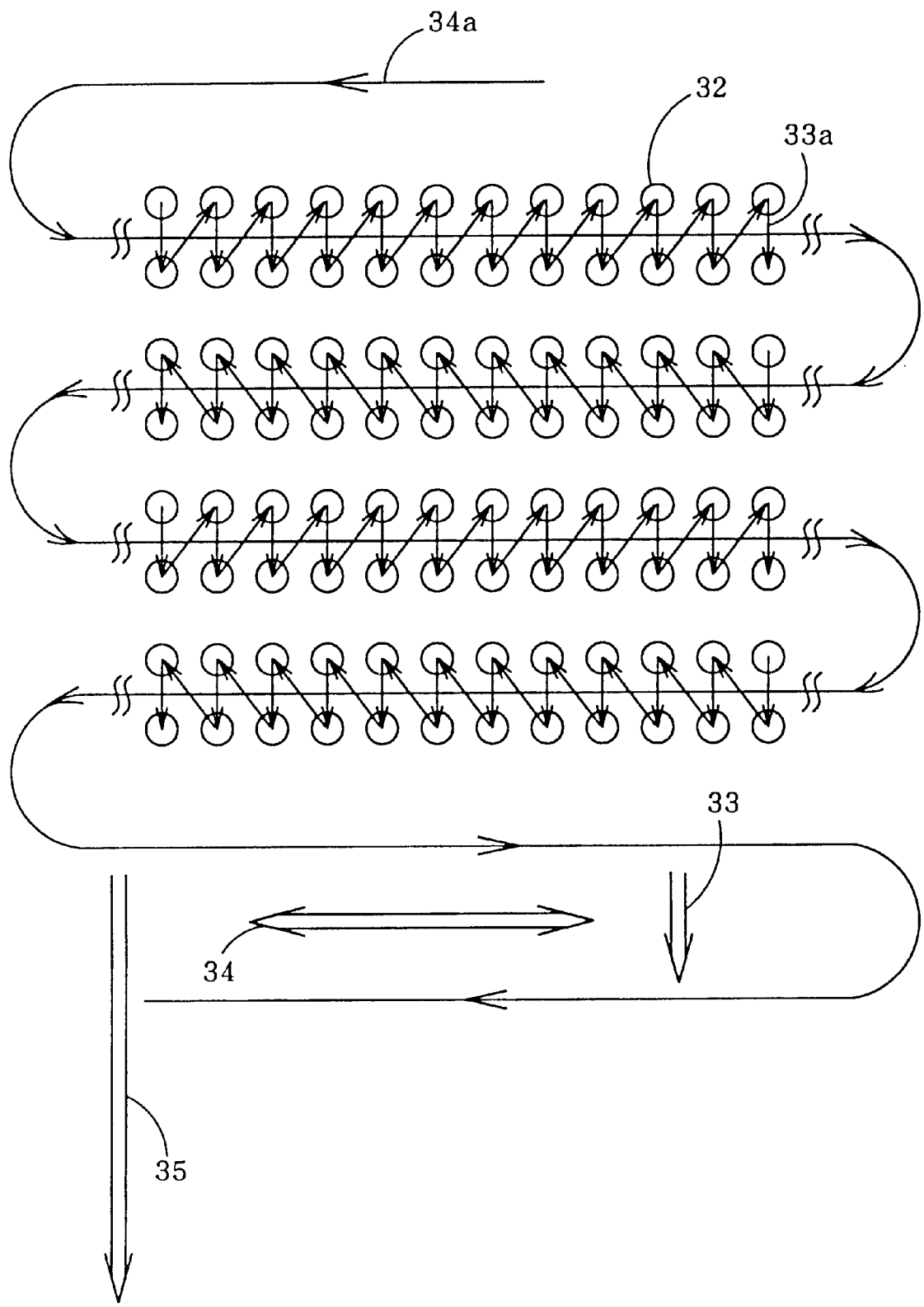
FIG. 2 shows the beam scanning pattern produced by the three scanning means of the microscope.

FIG. 2 shows the beam scanning pattern produced by the three scanning means in the laser scanning optical microscope of this embodiment. In FIG. 2, reference numeral 32 denotes a laser beam spot corresponding to a single image pixel, and arrows 33, 34 and 35 denote the respective directions of scanning by the first to third scanning means. 34a denotes the line of the sine wave scanning by the second scanning means; the sawtooth wave shaped linear scan of the third scanning means is downwards with reference to the drawing. As shown by arrow 33a indicating beam scanning by the first scanning means, the high-speed scanning is effected as a series of small oscillations that produce the zigzag pattern shown in the drawing, in accordance with the operation of the three deflectors.

This example assumes that scanning frequencies of 7.16 MHz, 3.94 kHz and 60 Hz have been selected for the first, second and third scanning means. Adjusting the phase timing, a 525 line TV picture raster can be formed thirty times a second. The naked eye cannot tell the difference between the irregular scanning pattern shown in the FIG. 2 and a standard horizontal and vertical scan pattern. However, the signals output by the photosensors have to be processed before they can be used to display the images on a TV monitor. This extremely important function is carried out by the signal processor 27, and will be explained in detail below.

As mentioned, an AOD optical deflector is easily capable of operating at a scanning frequency of 7.16 MHz. However, when two deflectors are used to scan at right-angles and an AOD is used to effect horizontal scanning at a 15.75 kHz frequency corresponding to a TV scanning frequency, as in conventional systems, it has been necessary to use a large aperture AOD to increase the image point resolution, which is extremely costly. In addition, the AOD has had to be bracketed by a pair of anamorphic lenses, which are complex to adjust. Also, with a fluorescent light microscope that uses an AOD, when the fluorescent light from the specimen has a different wavelength from that of the projected light, the deflection angle varies according to the wavelength and it has been difficult to improve the diffraction efficiency for each fluorescent wavelength across the whole range of scanning frequencies.

In contrast, the AOD forming the first scanning means in the system shown in FIGS. 1 and 2 can be a low cost one with a very small aperture, and anamorphic lenses are not necessary. Also, the AOD need only have a low resolving capability, so that by using prisms 4PI and 4PE as shown in FIG. 1, it is possible to obtain the maximum diffraction efficiency for all fluorescent wavelengths across all scanning frequencies.

A vibration mirror galvanometer capable of sine wave scanning at 3.94 kHz is also readily achievable. With a scanning frequency half that of the frequency used in conventional systems, the durability of the suspension and stability and scanning precision are no longer a problem, so reliability is high. Also, as both the diameter of the mirror and the deflection angle can be increased, a scanning system with a wide viewing angle can be obtained.

Figure 3:
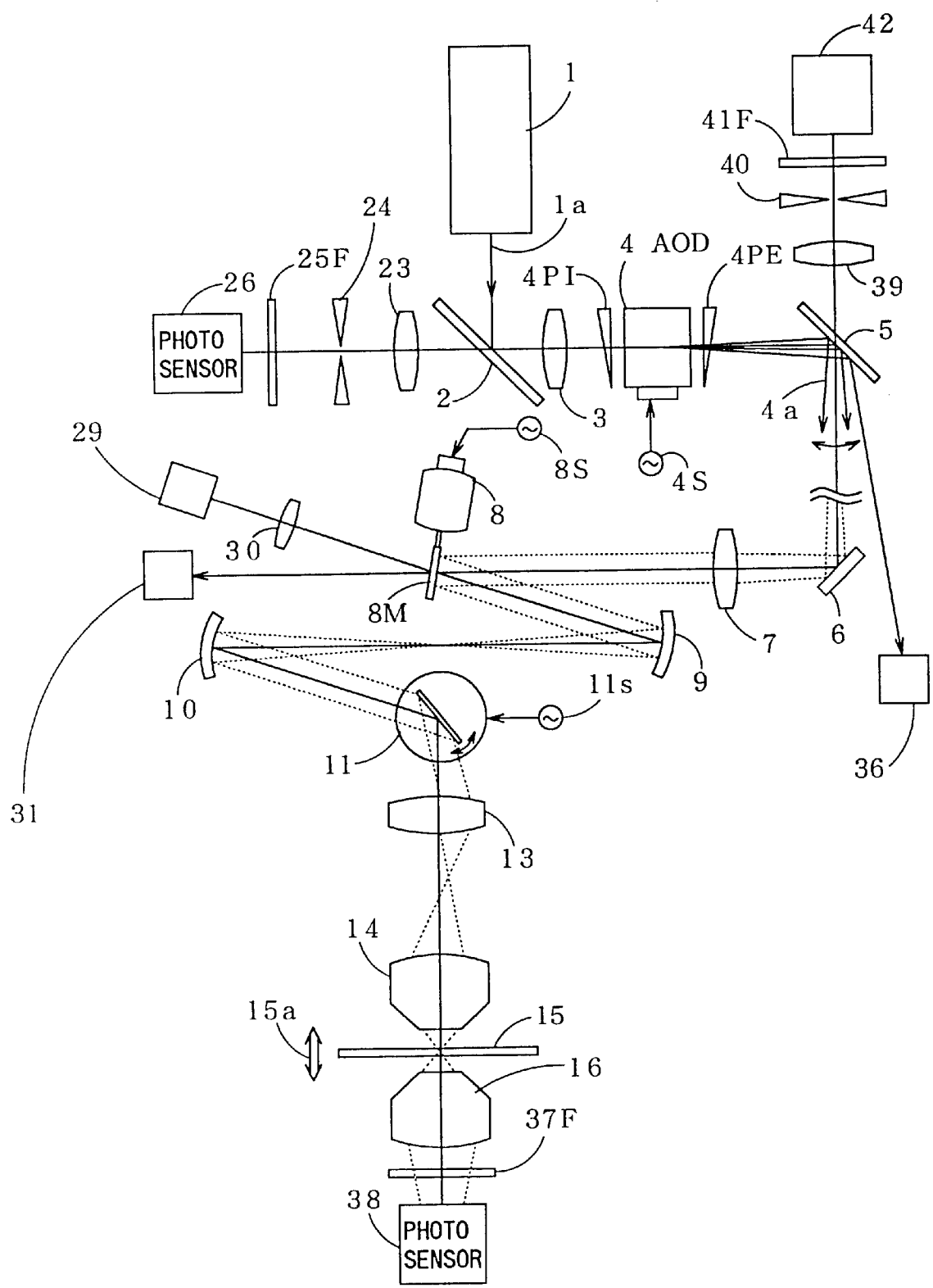
FIG. 3 shows the arrangement of the optical system of another embodiment of the invention.

FIG. 3 shows a slightly different embodiment. In the optical system arrangement of FIG. 1 a single photosensor 26 can be used to detect reflected light, transmitted light, reflected fluorescent light and transmitted fluorescent light, and which light will be detected is determined by selecting the appropriate filter 25F and polarizing plate 25p. Also, in each case, using the confocal aperture 24 made it possible to achieve a markedly better image resolution and contrast, compared to conventional optical microscopes. However, the light passes through the AOD or suchlike means which is used as the first scanning means, and with each such device having its own limitations of transmittance and polarization plane, the result is a somewhat large loss, which is a problem particularly when detecting weak fluorescent light.

This embodiment takes practical considerations into account. The advantages of this arrangement are that the optical settings are eased, with a slightly lower confocal effect than the arrangement of FIG. 1, and there is less loss when detecting fluorescent light.

In FIG. 3 the laser beam is scanned two-dimensionally by the first scanning means AOD 4, second scanning means vibration galvanometer 8 and third scanning means galvanometer 11, in the same arrangement shown in FIGS. 1 and 2. Not described in detail with reference to FIG. 1 is that non-diffracted (zero-order) light and diffracted (first-order) light produced by the AOD 4 can be separated such as by the mirrors 5 and 6. Specifically, with reference to FIG. 3, by using a portion of the mirror 6 to reflect only the light scanned in one dimension by the AOD 4, this light can be utilized for projection at the specimen 15 via lens 7, while the non-diffracted (zero-order) portion of the light separated by the mirror 6 is detected by the photosensor 36 and used as a laser beam power monitor signal.

The laser beam scanned two-dimensionally by the first to third scanning means 4, 8 and 11 is projected onto the specimen 15 by the objective lens 14, and light transmitted by the specimen is guided by objective lens 16 and filter 37F to be detected by a photosensor 38. Although not a confocal system, this detection by the photosensor 38 enables cells and other such biological specimens to be viewed with good contrast. Moreover, the optical system itself is very much simpler than the transmitted light detection path arrangement shown in FIG. 1, and therefore has the advantage that it eliminates the need to make fine optical adjustments. The photosensor 38 can be used to detect fluorescent light transmitted by the specimen by using a prescribed setting for the filter 37F.

The light reflected from the specimen 15 passes via elements 14, 13, 12, 11, 10, 9, 8, 7, 6, 5, 4, 3, 2, 23, 24 and 25F for detection by the photosensor 26. This is the same arrangement as the one already described with reference to FIG. 1, except that in this case the mirror 5 is a dichroic mirror, so that reflected fluorescent light from the specimen 15 is transmitted by the dichroic mirror 5 and is relayed by lens 39, confocal aperture 40 and filter 41F to the photosensor 42, which is used for detecting fluorescent light. Thus, as the reflected light to be detected does not go via the AOD, the transmission loss and polarization plane limitations of the AOD are avoided, raising detection efficiency. This is particularly advantageous when detecting weak fluorescent light from cells and the like.

An example of an arrangement in which the optical system uses an acousto-optical modulator (AOM) to modulate the laser beam scanned two-dimensionally by two mechanical deflectors (two mirror galvanometers arranged at right angles), which at first glance seems similar to the arrangement shown in FIG. 1 or FIG. 3 has been described in SPIE Proceedings Vol. 1028 (1988) pp 211 to 216).

However, it is important to note that while in conventional laser scanning optical microscopes the laser beam may be modulated or deflected by acousto-optical means, two-dimensional scanning of the laser beam is always effected by two deflectors arranged at right-angles. In contrast, with the system apparatus according to this embodiment of the invention, two-dimensional scanning is effected by three scanning means, each operating at a different scanning frequency. The explanation made with reference to FIG. 2 shows clearly that the special scanning line format provided by the AOD 4 that constitutes one of these scanning means in the embodiment illustrated by FIG. 3 has a new and important function that differs completely from conventional systems.

Figure 4A:
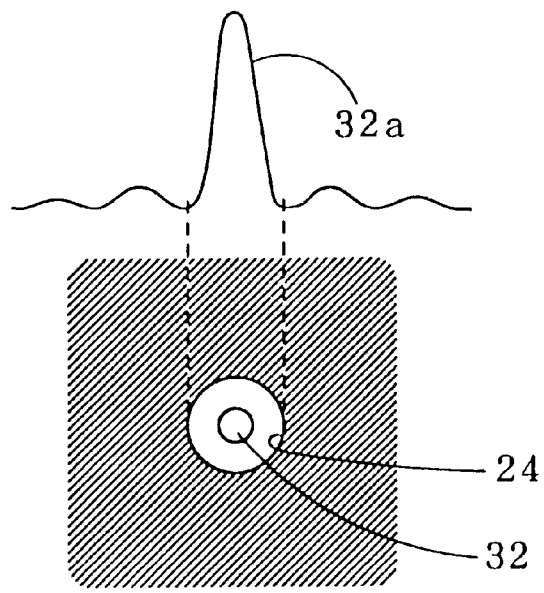
FIGS. 4(a)–4(c) show the shape and size of the confocal aperture in the light receiving system of the microscope.
Figure 4B:
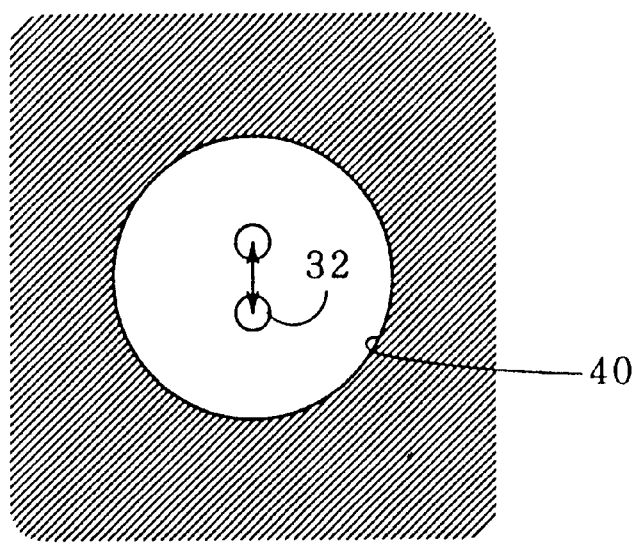
Figure 4C:
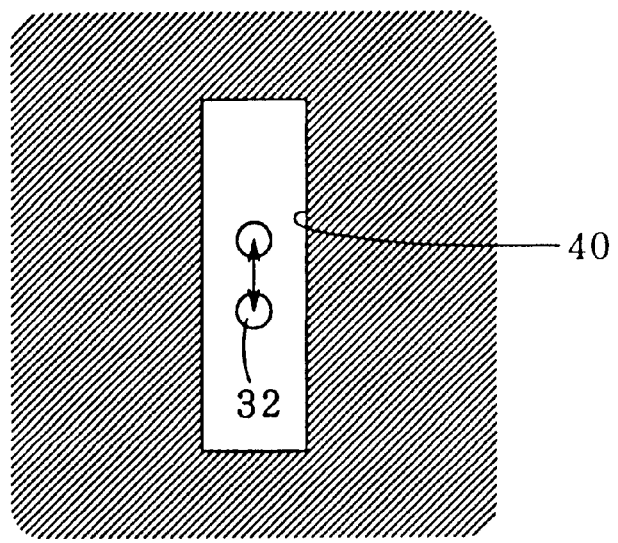

FIG. 4 shows the relationship between the size of the incident laser beam spot on the specimen 15 and the size of the confocal apertures 24 and 40. FIG. 4 (a) shows the relationship between confocal aperture 24 and the size of the beam spot 32 that forms the image on the aperture. With the laser beam spot 32 corresponding to one image pixel, the intensity distribution of the image forming beam is generally established as a Fraunhofer diffraction image 32a. With the confocal optical systems of FIG. 1 and FIG. 3, image resolution and contrast can be markedly improved through the elimination by the aperture 24 of the light intensity distribution around this diffraction image.

The reflected light beam from the specimen that forms an image at the confocal aperture 40 is scanned in the same direction as the beam scanned by the AOD 4. Thus, if for example a round confocal aperture 40 is used, as shown by FIG. 4 (b), the laser beam spot 32 corresponding to one image pixel will be constantly making small, high-speed movements within the aperture 40. The aperture 40 must therefore be large enough to permit the full range of beam movement while at the same time it has to be small enough to provide an adequately high specimen image contrast. The confocal aperture 40 may be rectangular (slit-shaped) as in FIG. 4 (c).

A practical problem with respect to the diameter of the laser beam spot projected onto a biological specimen is that the size of the reflected beam that forms the image at the confocal aperture 40 may have been increased by the strong optical diffusivity of the biological tissues. Thus, even with a confocal aperture 40 that is quite large (in diameter in the case of a round aperture, or width in the case of a slit) relative to the size of the incident beam's Airy disk, for example, in most cases it is possible to obtain good specimen images with high contrast and a high detection signal-to-noise S/N ratio and resolution.

With a conventional system using an AOD set to scan at a rate that corresponds to a TV horizontal scan frequency, there are many constraints on the confocal aperture that can be used, especially when detecting fluorescent light. In contrast, the combination of three deflectors to effect the two-dimensional scanning as used in the system of this embodiment makes it possible to use a round, rectangular or other such aperture shape as required, and it also improves system design flexibility by allowing the most suitable aperture to be selected to match the particular laser wavelength and the characteristics of the specimen concerned.

Figure 5:
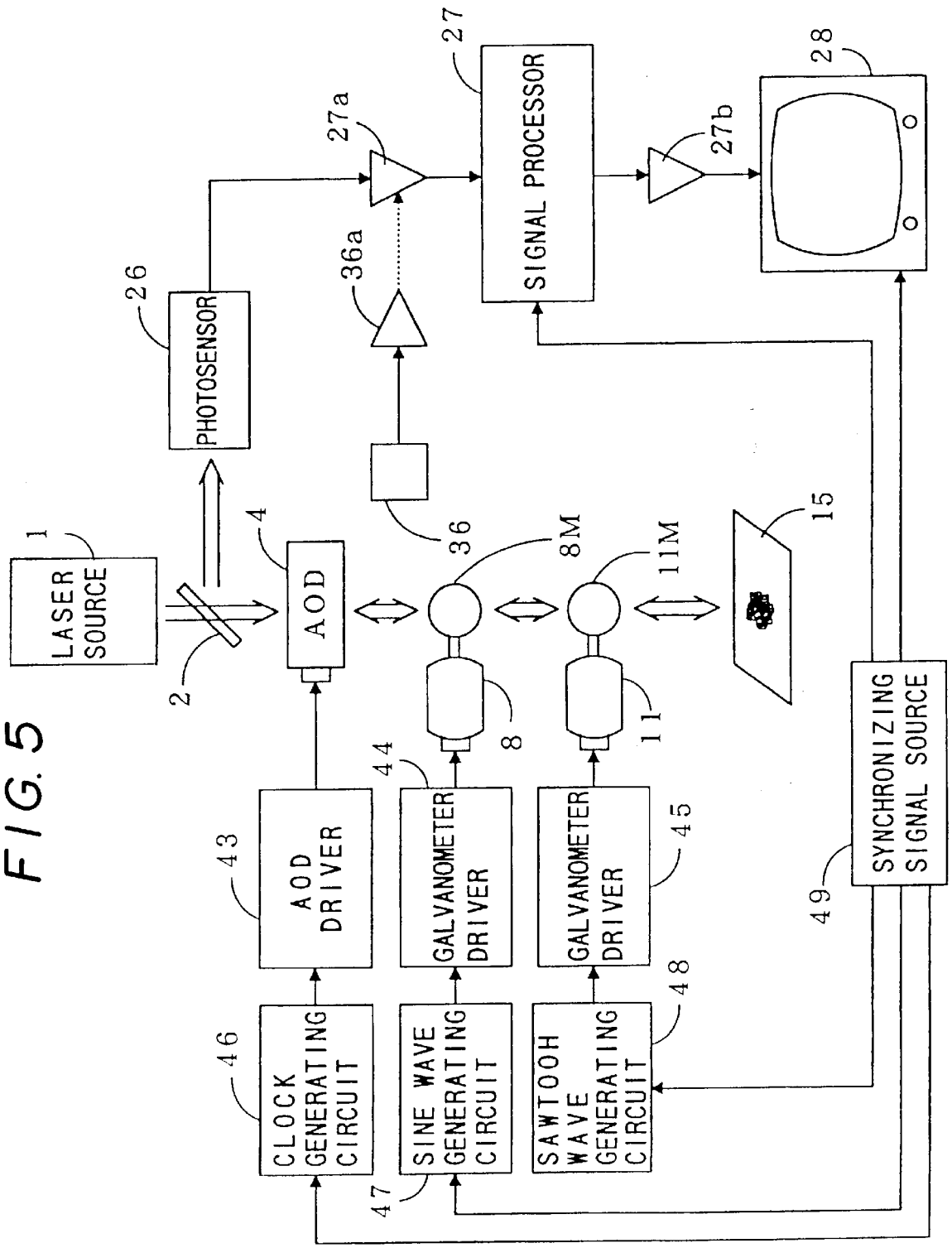
FIG. 5 is a block diagram of the electrical configuration of the microscope system.

FIG. 5 is a block diagram illustrating the electrical configuration of the laser scanning optical microscope according to the present invention. While in this illustration the detector is the photosensor 26 used in the optical system of FIG. 1, the configuration is basically the same as that of FIG. 3 using photosensors 38 and 42.

The laser beam emitted by the laser light source 1 is scanned by a trio of optical scanning means consisting of the AOD 4, vibration galvanometer 8 and galvanometer 11, which are driven by their respective drive circuits 43, 44 and 45 in accordance with respective waveform signals from a scanning clock generating circuit 46, sine wave generating circuit 47 and sawtooth wave generating circuit 48. Synchronized operation of the three scanning means 4, 8 and 11 is controlled by synchronizing signals from a synchronizing signal source 49 applied to each of the generating circuits.

Light reflected from the specimen 15 passes the three scanning means 11, 8 and 4 and is converted to an electrical signal by a high sensitivity photosensor 26 such as an avalanche photodiode (APD) or photomultiplier. The photosensor 26 outputs a signal which is amplified to a prescribed level by an amplifier 27a and then input to the signal processor 27 for scanning system conversion. Specifically, the signal processor 27 converts the type of irregular scanning pattern shown in FIG. 2 to a form that enables the specimen image signals to be input to an ordinary TV monitor.

The specimen image signals thus processed are amplified to a prescribed level by an amplifier 27b and input to an image output device 28 to thereby display the images of the specimen 15 obtained on a real-time basis by the scanning laser beam. In the process of amplifying the detection signals from the photosensor 26, by using laser beam intensity monitoring signals from the monitor photosensor 36 and amplifier 36a to control the amplification factor of the amplifier 27a, the images of the specimen displayed on the TV monitor have a high S/N ratio, providing a clear, sharp picture unaffected by any laser beam power variations that may occur.

Figure 6:
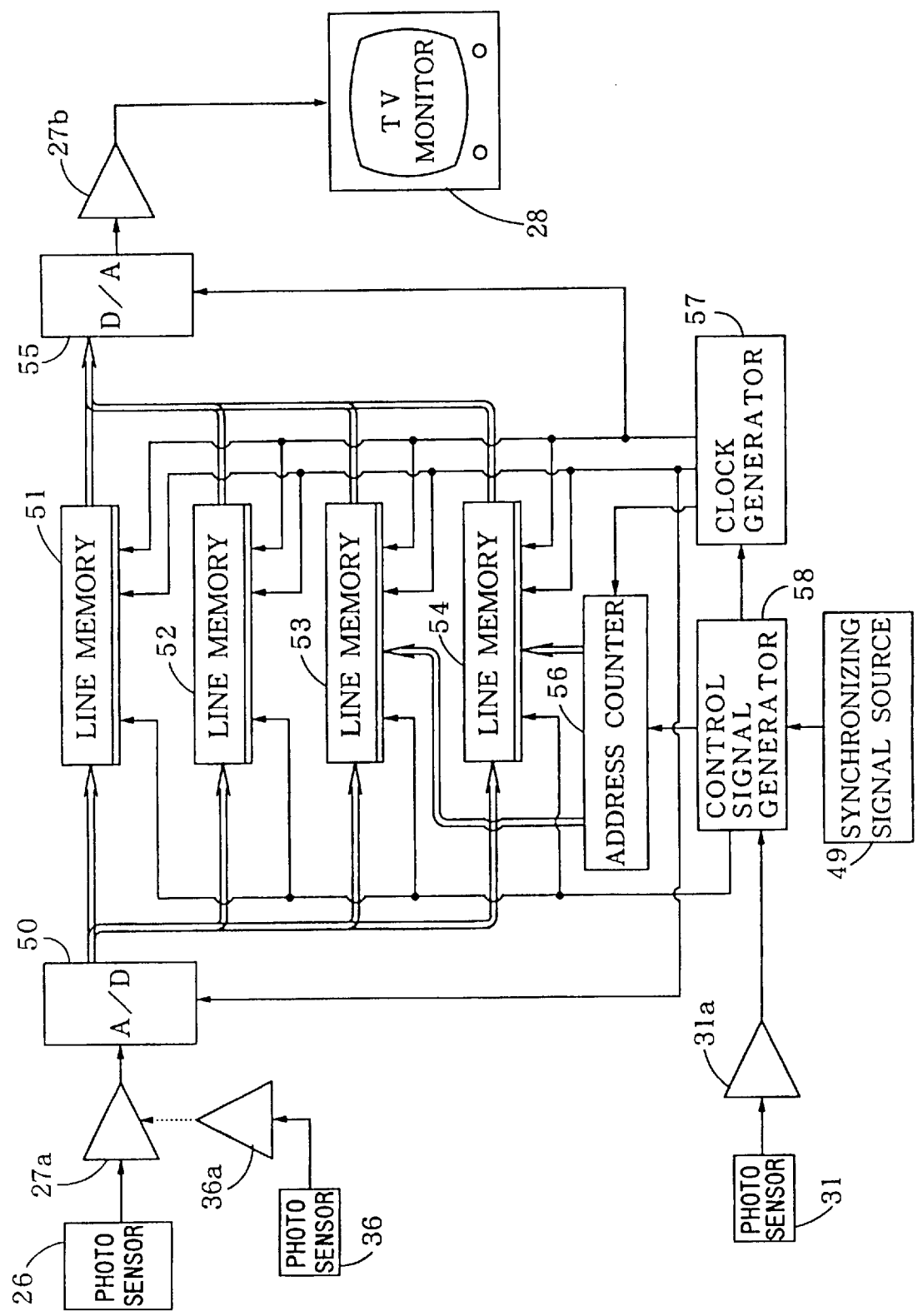
FIG. 6 is a block diagram of the signal processing arrangement used to convert the scanning format used by the microscope system.

FIG. 6 is a block diagram showing the arrangement of the signal processor 27 in further detail. Specimen image detection signals from the high sensitivity photosensor 26 are amplified by the amplifier 27a and converted by an A/D converter 50 to 10-bit digital data with a clock rate of 14.3 MHz, for example. The digital data output by the A/D converter 50 is transferred to line memories 51 to 54 in the signal processor 27 corresponding to one scan line of a TV picture, and is then read out of these memories and input to a D/A converter 55 for conversion back to analogue signals. The output of the D/A converter 55 is input via amplifier 27b to an image output device 28 such as a TV monitor to provide a real-time display of the microscopic images.

The four line memories are each able to hold 1024×10-bit pixels, for example, with one line memory corresponding to one scan line. Line memories 51 and 52 are allocated to the outward sine wave movement of the second scanning means 8 and line memories 53 and 54 to the inward movement. Line memories 51 and 52 use a first in, first out (FIFO) scheme, while line memories 53 and 54 require the use of a last in, first out scheme. For this, the memories are connected to an address counter 56 for reversing the coordinates. The line memories 51 to 54 and the address counter 56 operate in accordance with clock signals from a clock generator 57. Timing of memory reads and writes is controlled by drive signals produced by a control signal generator 58 for each of the digital elements.

The control signal generator 58 is operated in accordance with synchronizing signals from a synchronizing signal source 49, and timing signals from the third photosensor 31 and amplifier 31a, utilizing reflection from the back of the second scanning means 8M, are used at a reference to control memory writes. By controlling actual changes in vibration mirror oscillation, detected as a reference signal, the effects of any image distortion or the like arising from changes in sine wave oscillation that are temperature based or caused by hysteresis can be excluded from the image displayed on the TV monitor.

Figure 7:
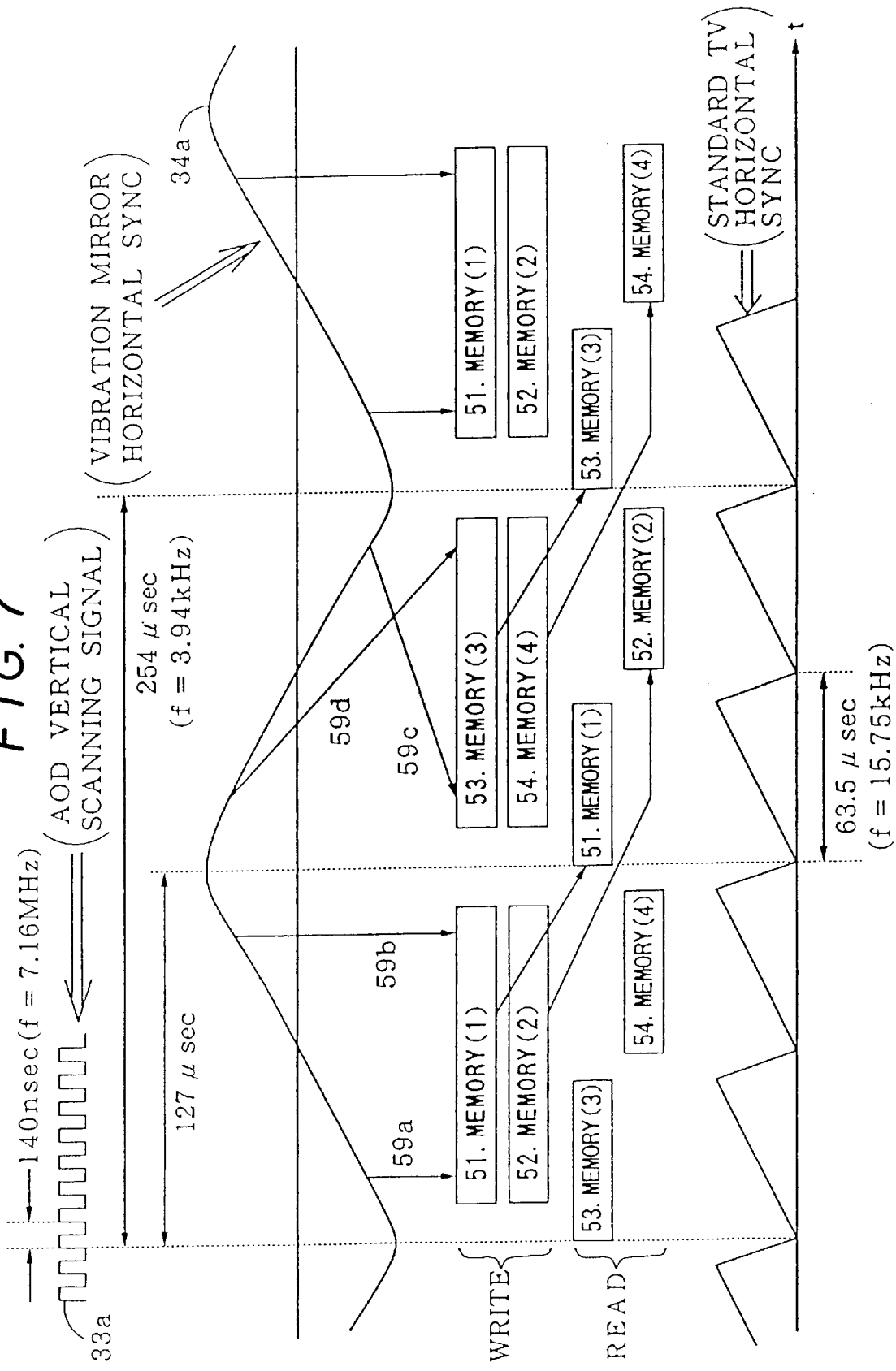
FIG. 7 illustrates the system's line memory based scanning conversion method.

FIG. 7 provides further details of system memory operation. In FIG. 7 the horizontal axis is time, and the path of the scan produced by the second scanning means is shown as a sine wave function 34a. With the scanning frequency of 3.94 kHz used in this example, the scanning period is 254 μsec. As shown in FIG. 7, the small, high-speed deflection scan 33a of the first scanning means AOD 4 produces two scan lines for each half period of the sine wave. Thus, as shown by arrows 59a and 59b, data is written into line memories 51 and 52 during the outward sine wave movement, starting with the top address, and is read out in the following half period. As shown by arrows 59c and 59d, during the inward sine wave movement data is written into line memories 53 and 54 starting from the bottom address, and after a sine wave half period the addresses are reversed and the data is read out starting from the top address. The result is that the video signal formed by reading out the memory contents has a period and format that make it exactly equivalent to the scanning signal of a standard TV system.

Reversing memory addresses in the course of sine wave motion to produce an image is known in the prior art. A specific example of such a configuration is described by JP-A-3-181911, for example. However, an important characteristic possessed by this invention but not found in prior art arrangements is that using three or more optical scanning means makes it possible to form a plurality of scanning lines (two, in the present example) within half a horizontal scan period, and that doing this makes it possible to considerably reduce the performance demands imposed on the scanning means used in the system. For example, compared to a conventional system, a much slower scan rate specification can be applied to the mirror of the second scanning means, but when the data is read out from the memory a specimen image signal can be formed that is exactly equivalent to a standard TV signal.

Although conversion of the irregular scanning pattern of the three scanning means as shown in FIGS. 6 and 7 has been described with reference to using line memory means for the conversion, field memory or frame memory means can also be used to accomplish the same objective with only slight time delay differences. Despite its complexity, the signal processor can be realized at a low cost, thanks to the advances made in integrated circuit technology.

Figure 8A:
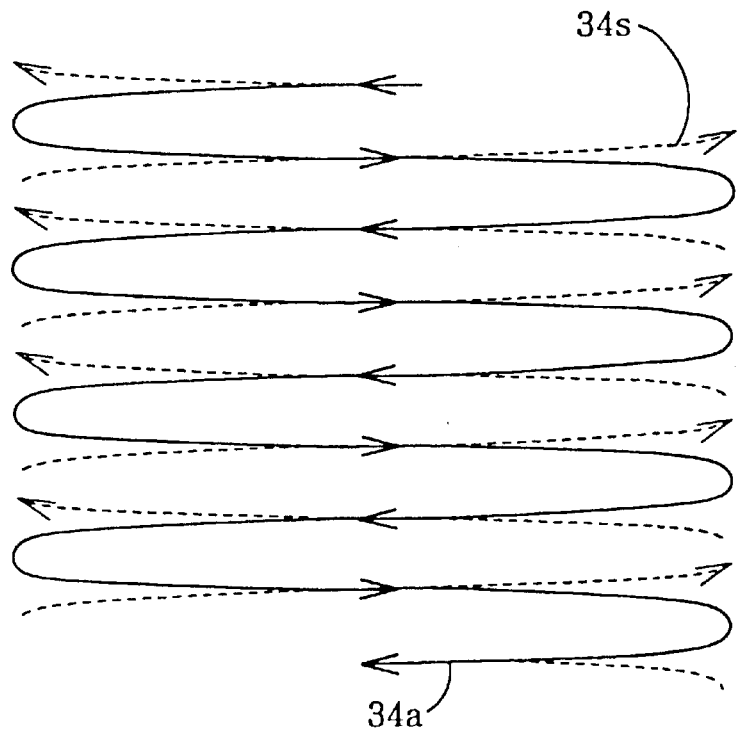
FIGS. 8(a) and 8(b) show the method of correcting laser raster distortion in the microscope.
Figure 8B:
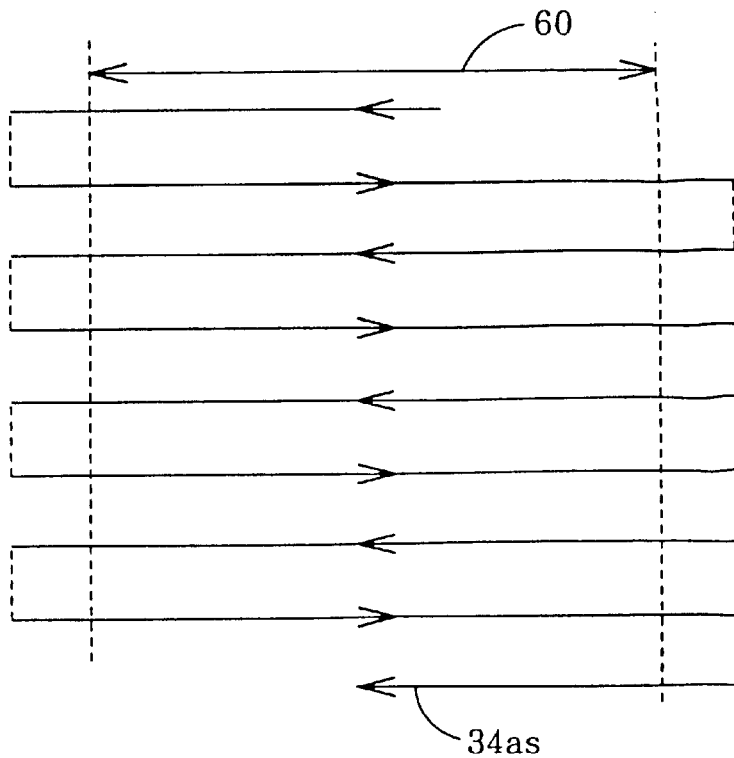

FIG. 8 illustrates a method used in the system of this embodiment to correct image plane distortion. A drawback of sinusoidal oscillation scanning has been that generally it has tended to compress the scan lines at each side, degrading the resolution and producing an unnatural rendering of image details. There have been no measures to counter this when sine wave vibration mirrors are used with conventional laser scanning optical microscopes.

In the laser scanning optical microscope of this invention, however, the deflection angle DC level of the first scanning means AOD is shifted with respect to the scan line 34a (FIG. 8 (a)) of the second scanning means, which provides the lift indicated by the dotted line 34s and thereby produces a laser raster 34as having a substantially uniform scan line spacing, as shown by FIG. 8 (b)). It is difficult to perform this correction of scan line spacing with just the second and third scanning means, and it only becomes possible when at least three scanning means are used with the inclusion of the first scanning means AOD.

An advantage of the uniform scan line spacing is that even when a sine wave vibration mirror is used to form part of the scanning arrangement, it enables a relatively long effective scan period to be used, with respect to the direction of vibration mirror scanning. By controlling the AOD drive power at this time so that the laser beam only illuminates within the range indicated in FIG. 8 (b) by arrow 60, the exposure of the specimen during the blanking interval can be minimized, thereby keeping discoloration of biological specimens to a minimum.

Figure 9A:
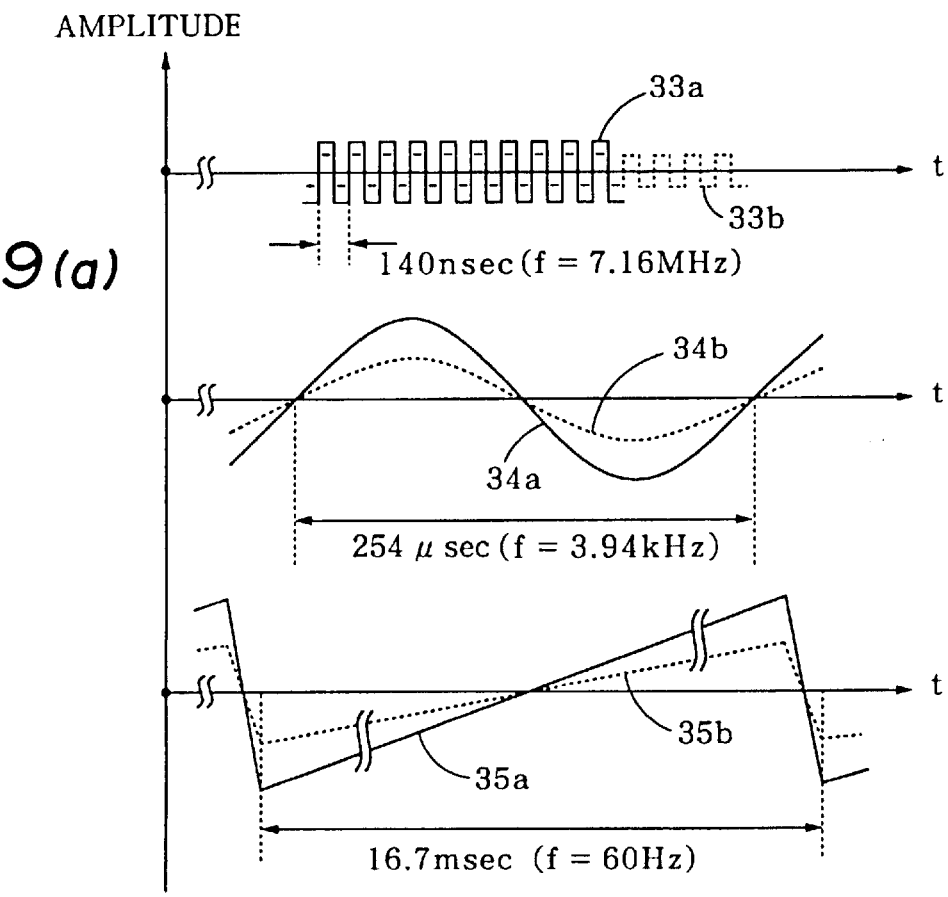
FIGS. 9(a) and 9(b) show the angle of view conversion principle applied in the microscope system.
Figure 9B:
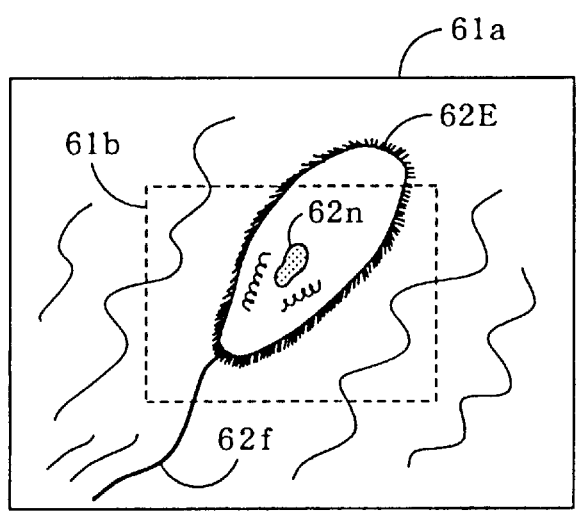

FIG. 9 illustrates an example of an angle of view conversion means in the system apparatus of this embodiment of the invention. FIG. 9 (a) shows the scanline waveforms of the three scanning means, each of which operates at a different scanning frequency. In this example, the scanning period (frequency) is 140 nsec (7.16 MHz) for the first scanning means, 254 μsec (3.94 kHz) for the second scanning means and 16.7 msec (60 Hz) for the third scanning means.

The scanning waveforms 33a, 34a and 35a indicated by solid lines in FIG. 9 (a) are assumed to be in the scanned specimen observation region 61a of FIG. 9 (b). The specimens being observed on a TV monitor in the illustrated example are Euglena (62E), a unicellular protozoan organism, and a cell nucleus (62n) and flagella (62f). Decreasing the amplitude of the scanning waveform, as shown in FIG. 9 (a) by the dotted lines 33b, 34b and 35b, reduces the scanned region to 61b, indicated in FIG. 9 (b) by the dotted line, which is magnified when displayed on the monitor screen. Thus, by adjusting the beam deflection angle of the three scanning means, specimens can be viewed at a zoom magnification of up to ×10, and can therefore be observed on a real-time basis while expanding or reducing the field of view, all without having to incorporate a special variable power optical system.

Figure 10:
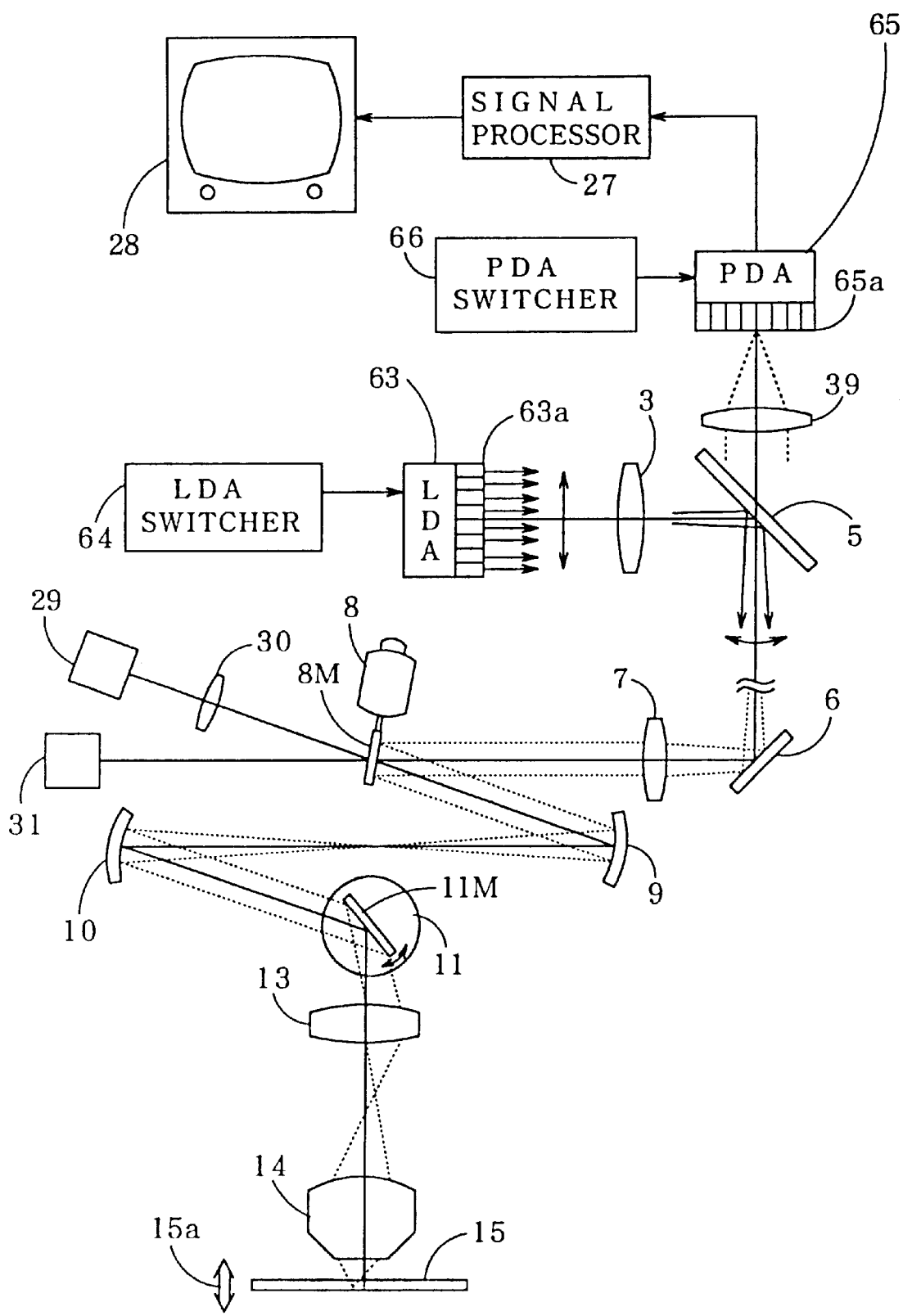
FIG. 10 shows the arrangement of the optical system according to another embodiment of the invention.

FIG. 10 shows an optical system arrangement according to another embodiment of this invention, in which the first scanning means is a laser diode array (LDA) 63.

The LDA 63 is comprised of eight laser diodes, and beam emission is from the front end 63a. The LDA 63 is controlled by a drive circuit 64; beam switching is used to produce 70 nsec scanning pulses. Thus, in this arrangement the laser light source itself forms the first scanning means.

The scanning laser beam emitted by the LDA 63 is projected onto the specimen 15 by the same optical system already described with reference to FIGS. 1 and 3. That is, the beam passes through lens 3 and is reflected through lens 7 by beam-splitter 5 and mirror 6, and is then guided via the same optical system elements used in the arrangement of FIG. 1. The second and third scanning means in this arrangement, too, are constituted by the two scanning mirrors 8M and 11M.

Reflected light from the specimen 15 travels back along the same path as the incident beam, and through beam-splitter 5 and lens 39, and forms an image on the light-receiving surface 65a of a photodiode array (PDA) 65. The PDA 65 consists of an array of high sensitivity photosensors such as avalanche photodiodes, eight in this example. Each of the eight elements of the PDA 65 has an optically conjugate relationship with each of the corresponding eight elements of the LDA 63. A PDA drive circuit 66 controls the PDA 65, whereby each of the elements outputs light receiving signals as the elements are switched. These signals are passed through the signal processor 27 for conversion to standard video signals, which are input to an image output device 28 such as a TV monitor.

The array elements are arranged at a pitch of about 100 $\mu$m, so even with eight such elements, the light emitting (light receiving) parts of the LDA 63 and PDA 65 are very small. In FIG. 10 the elements have been drawn larger to emphasize that they are separate elements.

Figure 11:
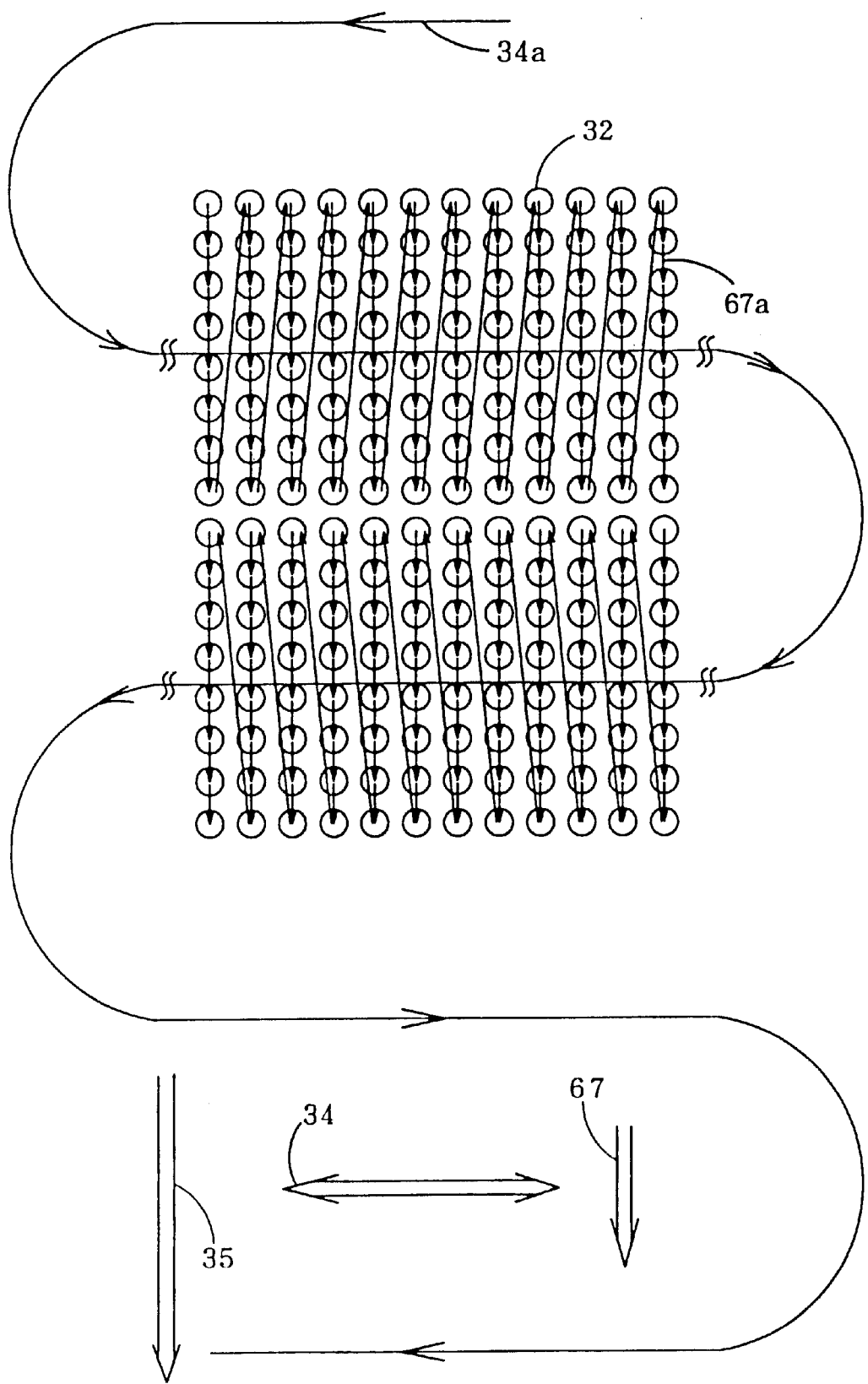
FIG. 11 shows a laser beam scanning pattern produced by the scanning means in the microscope system of the other embodiment.

FIG. 11 shows an example of a laser beam scanning pattern produced by using the three scanning means shown in the arrangement of FIG. 10. In FIG. 11, laser beam spots 32 each correspond to one image pixel, and arrows 67, 34 and 35 show the respective scanning directions of the first to third scanning means. Line 34a indicates a sinusoidal scan path of the second scanning means. Arrows 67a indicate the very high-speed nature of the switched beam scanning of the first scanning means, which with the operation of the three types of deflector produces the illustrated scanning pattern.

In this example, a scanning frequency (period) of 1.8 MHz (T=560 nsec=70 nsec×8) has been selected for the first scanning means, 980 Hz (1.02 msec) for the second scanning means and 60 Hz (16.7 msec) for the third, so that by using phase alignment of the scanning, a 525-line TV picture can be formed 30 times a second. Also, if the frequencies (periods) of the first and second scanning means are set at 5 MHz (T=200 nsec=25 nsec×8) and 2 kHz (500 $\mu$sec), respectively, laser scanning equivalent to over 1000 lines for high definition TV is possible. A laser diode array switching time as short as 10 nsec per pixel is possible, and a mirror frequency of 1 to 2 kHz is readily realizable, without problems about durability, reliability or resolution. Conversion of the detection signals accompanying the irregular scanning pattern can also be readily realized, based on the principle illustrated by FIGS. 6 and 7, with just slight modifications such as to the memory arrangement of the signal processor 27.

In the scanning pattern shown in FIG. 11, and in the scanning pattern already described such as with reference to FIG. 2, the vertical movement (indicated by arrow 67a in FIG. 11, or the arrow 33a in FIG. 2) of the beam spot effected by the first scanning means would actually have a diagonal component, owing to the effect of the scanning by the second scanning means. It is to be understood that image distortion produced by such motion can be corrected by adjusting the timing of each pixel controlling readouts from the memories described with reference to FIGS. 6 and 7. Even if there is any diagonal movement of the beam spot, any effect on the video signals obtained by D/A conversion of memory data can be suppressed by adjusting the phase of the corresponding clock. In the drawing the movement of the spot by the first scanning means is depicted as being perfectly vertical simply for descriptive convenience and simplicity.

Figure 12:
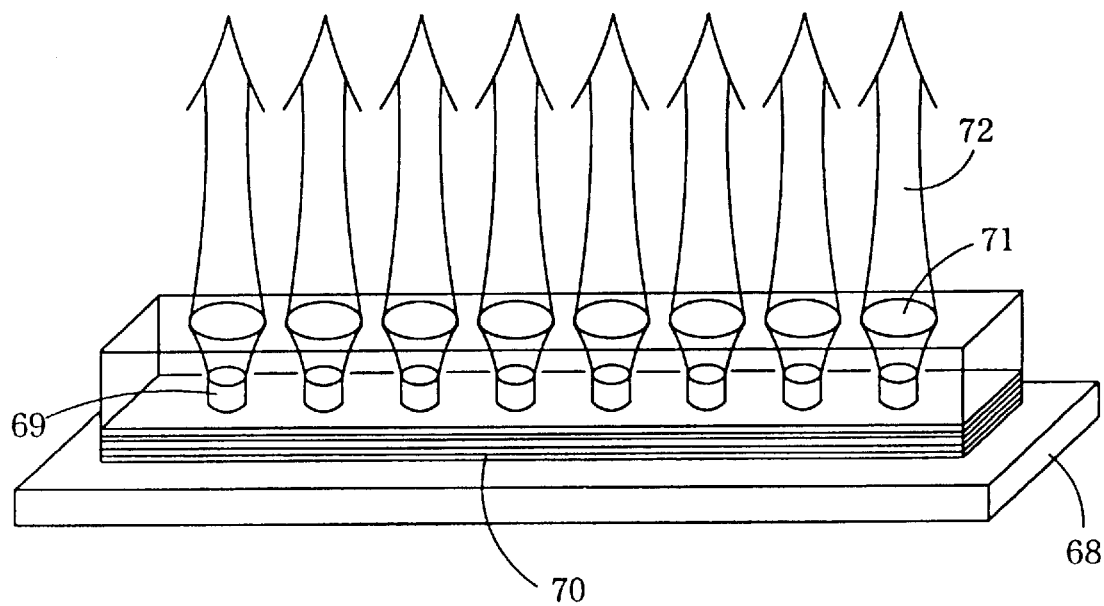
FIG. 12 is a perspective view of configuration of a laser diode array used in the embodiment.

FIG. 12 shows the configuration of the eight-element laser diode array (LDA). As shown, the LDA consists of microlaser chips 69 formed epitaxially on a gallium-arsenide substrate 68, and a switching microcircuit 70. Reference numeral 71 denotes an array of micro-lenses on the laser chips. These micro-lenses collimate the laser beam 72 emitted by each laser chip. As mentioned, the eight device elements are set very close together, so the whole light emitting section is very small but is fully capable of performing image scanning, using laser switching. With the LDA, the PDA 65 as shown in FIG. 10 can be realized using high sensitivity non-storage sensor arrays similar in structure to the arrangement shown in FIG. 12.

With respect to such light emitting/receiving array devices, it is important to note that owing to yield problems, the higher the number of array elements (i.e., the number of pixels) the more difficult and costly such devices are to manufacture.

If a 1000×1000 pixel laser diode array were to be fabricated and combined with a corresponding 1000-by-1000 high sensitivity non-storage sensor (the image dissector tube is one such sensor that has been produced), and technology developed whereby the two are synchronized while being switched at high speed to effect the scanning, it would surely be possible to apply to a laser scanning optical microscope. When that happens, previously developed SLMs might well all become obsolete. In this field of scanning technology, the ideal is the elimination of polygonal mirrors, vibration mirrors and other such mechanical moving parts, or the need to use special optical crystals such as AODs and the like, with all deflectors being replaced by semiconductor devices.

However, with respect to light emitting arrays, especially those with a high element count, low-cost fabrication of semiconductor devices capable of producing high quality laser beams of various wavelengths for laser scanning optical microscope system applications is very difficult, and likely to remain so for some time to come.

Thus, with respect to a practical system apparatus application in which a laser diode array arrangement is used, the ideal is to use it for one of the three typical scanning means, as in the arrangement of FIG. 10, to ensure an overall high level of system performance and reliability. At the same time this solves the problems of durability and scanning precision associated with vibration mirrors and other such means used as the other optical scanning means.

In cases where a polygonal mirror is used as the horizontal scanning means, the technical concept described in the foregoing with reference to the embodiments of this invention can also of course be utilized to reduce the speed (rpm) of the mirror and thereby improve performance factors such as bearing durability and reliability. In a conventional laser scanning optical microscope system that employs a polygonal mirror, a mirror having for example 25 facets has had to rotate at the high speed of 37,800 rpm for compatibility with standard TV systems. In contrast, if the arrangement of this invention is applied, with an AOD, EOD, laser diode array or other such means as the first scanning means, a polygonal mirror as the second scanning means (and a mirror galvanometer as the third scanning means), the horizontal scanning polygonal mirror speed can be reduced to 10,000 to 20,000 rpm. A polygonal mirror thus operating at a low speed reduces shaft run-out, vibration and other such problems, and as such enables the area of each of the mirror facets to be increased, which by reducing the relative optical shift of the pupil also enhances photodetection efficiency in the confocal system.

With the system apparatus according to this invention, also, there is a wide range of optical scanning means options. Depending on the order of the scanning frequency, for example, a waveguide type deflector or optical switching device can be used as the first scanning means, and a vibration mirror utilizing an acoustic or piezoelectric device may be used as the second scanning means. A single vibration mirror can be used that is operated at two frequencies to scan in two directions, and could therefore be regarded as equivalent to two (i.e., the second and third) scanning means.

It is to be understood that while the description of optical and electrical systems may have been made with reference to specific structural elements and numerical values, the intent of the invention is not limited by such structural elements and numerical values.

As described in the foregoing, the laser scanning optical microscope according to this invention uses three or more optical scanning means, each operating at a different scanning frequency, to scan a laser beam in two dimensions, which enables the scanning frequency, resolution, scanning stability, reliability and other such performance conditions required of each of the scanning means to be set at a considerably less rigorous level, ensuring a laser scanning system compatible with standard TV systems that provides high scanning precision and stability and is also highly durable. Although three scanning means are used, because the type of costly horizontal scanning means used by conventional systems to achieve both high scanning frequency and high resolution are not needed, a more reliable system can be made at a lower cost.

Moreover, the ability to configure the confocal system of the microscope with a round or slit-shaped detection aperture, regardless of whether specimens will be observed using reflected light or transmitted light, increases system design flexibility, and is also an advantage with respect to improving the contrast and resolution of specimen images.

Furthermore, although a special laser beam scanning pattern is used, the system is provided with signal processing means for converting the detection signals output by the photosensors to a standard television scanning line system, thereby providing real-time observation of specimen images on a standard television. As the laser beam scanning system can be operated at high scanning frequencies and the number of scan lines can be readily increased, the system can also be adapted to high definition television, and as such has good future upgradability.

When an AOD is used as the first scanning means, a vibration mirror as the second scanning means and a mirror galvanometer as the third scanning means, raster distortion accompanying sine wave oscillation can be corrected by controlling the deflection angle of the AOD. Moreover, the deflection angle of the AOD, vibration mirror and mirror galvanometer is adjustable, allowing specimens to be viewed at a zoom magnification power of up to ×10, and the optical system can be readily configured and adjusted.

If a laser diode array is used to form the first scanning means, an array with a relatively small number of elements can be utilized, and it also becomes possible to greatly reduce the scanning frequency of the vibration mirror used as the second scanning means, and as such serves to improve scanning precision and increase durability.

What is claimed is:

1. A laser scanning optical microscope in which a laser beam from a laser light source is focussed to a small spot by an objective optical system and projected onto a specimen while also being scanned two-dimensionally, and light reflected or transmitted by the specimen is detected and photoelectrically converted by light receiving means to thereby obtain image information on the specimen, the laser scanning optical microscope comprising:
    a laser diode array for generating a laser beam;
    a drive circuit for driving the laser diode array to scan a specimen with the laser beam in one direction at a prescribed frequency;
    two mechanical optical scanning means for scanning the laser beam perpendicularly and parallel to the scanning direction of the laser diode array at two frequencies that are lower than the prescribed frequency;
    light receiving means including a photodiode array for detecting and photoelectrically converting light reflected or transmitted by the specimen; and
    signal processing means for converting a detection signal obtained from the light receiving means to a standard television scanning signal corresponding to a laser beam scanning pattern obtained with the laser diode array and two mechanical optical scanning means.

2. A laser scanning optical microscope according to claim 1, further comprising focal adjusting means for adjusting an image formation position of the laser beam focussed to a small spot by the objective optical system, or a position of the specimen, to be moved along an optical axis of the objective optical system of the microscope.

3. A laser scanning optical microscope according to claim 1; wherein the laser beam scanning pattern formed by all of the optical scanning means is a two-dimensionally moving zig-zag pattern formed by scanning the laser beam in a first direction perpendicular to a second scanning direction while the laser beam makes small oscillations along the first scanning direction, and scanning the laser beam in a third direction parallel to the first scanning direction.

4. A laser scanning optical microscope according to claim 1; wherein the light receiving means detects light from at least two of the optical scanning means reflected or transmitted by the specimen via a prescribed confocal aperture.

5. A laser scanning optical microscope according to claim 1; wherein the laser beam from the laser diode array is projected onto the specimen along a laser beam path, and the light reflected or transmitted by the specimen is directed to the light receiving means along a light detection path; and wherein a portion of the laser beam path coincides with a portion of the light detection path.

6. A laser scanning optical microscope according to claim 1; wherein the signal processing means for converting a detection signal obtained from the light receiving means to a standard television scanning signal comprises an A/D converter for performing analogue-to-digital conversion of the detection signal, a memory for storing digital data output by the A/D converter, control means for controlling the writing of data to, and readout of data from, the memory, and a D/A converter for performing digital-to-analogue conversion of digital data read out of the memory.

7. A laser scanning optical microscope comprising:
    a first optical scanning device comprising a laser diode array for generating a laser beam and scanning a specimen with the laser beam in a direction at a preselected frequency;
    a pair of second optical scanning devices for scanning the laser beam in directions perpendicular and parallel to the scanning direction of the first optical scanning device at two frequencies lower than the preselected frequency;
    a light receiving device disposed to receive light reflected or transmitted by the scanned specimen and operative to produce a photoelectric signal; and
    a signal processing device operative to convert the photoelectric signal obtained from the light receiving device to a standard television scanning signal corresponding to a laser beam scanning pattern obtained with the first optical scanning device and the pair of second optical scanning devices.

8. A laser scanning optical microscope according to claim 7; further comprising a focal adjusting device for adjusting an image formation position of the laser beam on the specimen.

9. A laser scanning optical microscope according to claim 7; wherein the laser beam scanning pattern formed by the laser diode array and the pair of mechanical optical scanning devices comprises a two-dimensionally moving zig-zag pattern formed by scanning the laser beam in a first direction perpendicular to a second scanning direction while the laser beam makes small oscillations along the first scanning direction, and scanning the laser beam in a third direction parallel to the first scanning direction.

10. A laser scanning optical microscope according to claim 7; wherein the light receiving device detects light reflected or transmitted by the specimen from at least two of the laser diode array and the pair of mechanical optical scanning devices via a prescribed confocal aperture.

11. A laser scanning optical microscope according to claim 7; wherein the laser beam from the laser diode array is projected onto the specimen along a laser beam path, and the light reflected or transmitted by the specimen is directed to the light receiving device along a light detection path; and wherein a portion of the laser beam path coincides with a portion of the light detection path.

12. A laser scanning optical microscope according to claim 7; wherein the signal processing device comprises an A/D converter for performing analogue-to-digital conversion of the photoelectric signal, a memory for storing digital data output by the A/D converter, control means for controlling the writing of data to, and readout of data from, the memory, and a D/A converter for performing digital-to-analogue conversion of digital data read out of the memory.

* * * * *